United States Patent
Werner et al.

(10) Patent No.: US 12,181,443 B2
(45) Date of Patent: Dec. 31, 2024

(54) AUGMENTED REALITY IN ULTRASONIC INSPECTION

(71) Applicant: Baker Hughes Holdings LLC, Houston, TX (US)

(72) Inventors: Daniel Werner, Hurth (DE); Paul Buschke, Hurth (DE); Dionys van de Ven, Hurth (DE); Weiwei Zhang, Bonn (DE)

(73) Assignee: Baker Hughes Holdings LLC, Houston, TX (US)

( * ) Notice: Subject to any disclaimer, the term of this patent is extended or adjusted under 35 U.S.C. 154(b) by 420 days.

(21) Appl. No.: 17/705,249

(22) Filed: Mar. 25, 2022

(65) Prior Publication Data

US 2022/0313216 A1 Oct. 6, 2022

Related U.S. Application Data

(60) Provisional application No. 63/168,983, filed on Mar. 31, 2021.

(51) Int. Cl.
  *G01N 29/22* (2006.01)
  *G02B 27/01* (2006.01)
  (Continued)

(52) U.S. Cl.
  CPC ....... *G01N 29/226* (2013.01); *G02B 27/0103* (2013.01); *G06F 3/0484* (2013.01); *G06T 7/97* (2017.01); *G01N 2291/044* (2013.01)

(58) Field of Classification Search
  CPC ..... G06T 7/97; G06F 3/0484; G02B 27/0103; G01N 29/226; G01N 2291/044
  (Continued)

(56) References Cited

U.S. PATENT DOCUMENTS

| 11,566,888 B1* | 1/2023 | Rollinson | B25J 18/00 |
| 2011/0191707 A1 | 8/2011 | Lee et al. | |
| 2019/0355111 A1* | 11/2019 | Keene | G06V 40/28 |

FOREIGN PATENT DOCUMENTS

WO  2020084117 A1  4/2020

OTHER PUBLICATIONS

International Search Report and Written Opinion of International Application No. PCT/US2022/071465 mailed Jul. 22, 2022, 10 pages.

* cited by examiner

*Primary Examiner* — Jacinta M Crawford
(74) *Attorney, Agent, or Firm* — Mintz, Levin, Cohn, Ferris, Glovsky and Popeo, P.C.

(57) ABSTRACT

Systems and methods for improved visualization of non-destructive testing (NDT) measurements are provided. A probe can be employed to acquire NDT measurements of a target. Images of the target can also be captured during testing. The captured images can be analyzed to identify selected objects therein (e.g., the target, the probe, etc.) Graphical user interfaces (GUIs) including the NDT measurements can be further generated for viewing in combination with the target. In one aspect, the GUI can be viewed as a hologram within a display of an augmented reality device when viewing the target. In another aspect, the GUI can be projected upon the target. The GUI can be configured to overlay the NDT measurements at the location where the NDT measurements are acquired. This display of the NDT measurements can help an inspector more easily relate the NDT measurements to the target and improve reporting of the NDT measurements.

16 Claims, 10 Drawing Sheets

(51) Int. Cl.
*G06F 3/0484* (2022.01)
*G06T 7/00* (2017.01)
(58) Field of Classification Search
USPC .......................................................... 345/633
See application file for complete search history.

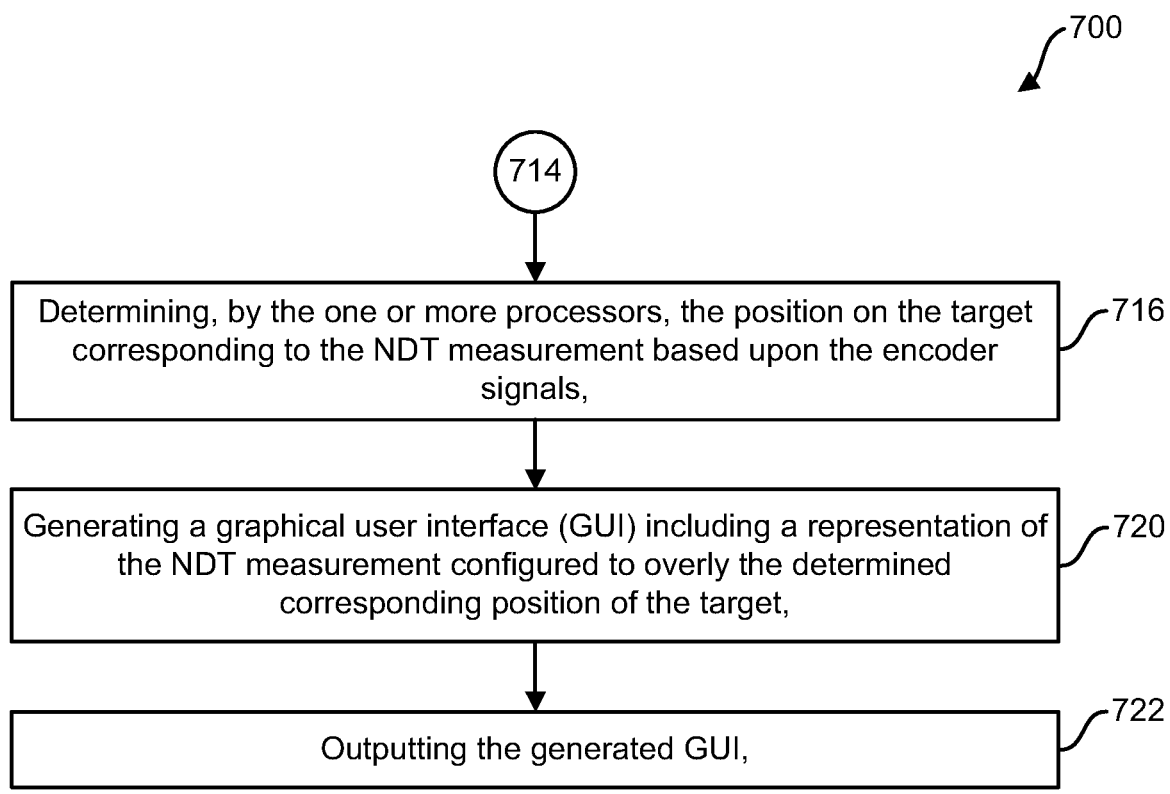
FIG. 7 (con't)

AUGMENTED REALITY IN ULTRASONIC INSPECTION

CROSS-REFERENCE TO RELATED APPLICATIONS

This application claims the benefit of U.S. Provisional Patent Application No. 63/168,983, filed on Mar. 31, 2021 and entitled "Augmented Reality In Ultrasonic Inspection," the entirety of which is incorporated by reference.

BACKGROUND

In some instances, non-destructive testing (NDT) is a class of analytical techniques that can be used to inspect characteristics of a target object, without causing damage. As an example, NDT can be employed to identify the presence of defects within the target object and quantify characteristics of such defects, such as location, size, orientation, etc. NDT is commonly used in industries that employ structures that are not easily removed from their surroundings (e.g., pipes or welds) or where failures can be catastrophic, such as aerospace, railroad, power generation, oil and gas transport or refining, amongst others.

Ultrasonic testing is one type of NDT. Ultrasound is acoustic (sound) energy in the form of waves that have an intensity (strength) which varies in time at a frequency above the human hearing range. In ultrasonic testing, one or more ultrasonic signals can be generated and directed towards a target. As the ultrasonic signals penetrate the target, they can reflect from features such as outer surfaces and interior defects (e.g., cracks, porosity, etc.) The reflected ultrasonic signals can be detected and analyzed to acquire ultrasonic measurements such as acoustic strength as a function of time. From the ultrasonic measurements, features of the target, such as defects and geometric characteristics, can be identified and characterized.

SUMMARY

Under some circumstances, NDT can be performed manually by an inspector using a portable NDT device. The portable NDT device can include a probe in communication with a controller. During testing, the inspector can inspect selected locations of the target object by holding the probe in at least one hand adjacent to the selected location. The controller can drive the probe to generate signals incident at the selected location of the target object. The probe can further detect return signals that reflect from the target and provide the return signals to the controller. The controller can further analyze the return signals to yield NDT measurements and further display the NDT measurements. Typically, the controller is also held by the inspector to view the NDT measurements.

Portable NDT devices can be problematic, however. Notably, to view test results in real time while conducting an inspection, an inspector can be required to hold both the probe and controller concurrently. Lacking a free hand can expose the inspector to safety risks in some testing sites, such as sites where the inspector accesses the target object by rope.

Reporting quality is a further problem generally encountered with NDT. NDT measurements are traditionally recorded on paper or computer. However, the signals generated and detected by NDT probes are not visible to the eye. As a result, when reporting NDT measurements, errors can be made when correlating the NDT measurements to the actual part being inspected.

Training is an additional problem generally encountered with NDT. As noted above, the signals generated and detected by NDT probes are not visible to the eye. As a result, it can be difficult to explain how the signals travel through the target object or how to relate displayed NDT measurements to the actual part being inspected.

Accordingly, embodiments of the present disclosure provide improved systems and methods for visualizing NDT measurements. As discussed in detail below, images of a target can be captured during NDT testing. The captured images can be analyzed to identify selected objects therein (e.g., the target, the probe, etc.) Graphical user interfaces (GUIs) including the NDT measurements can be further generated for viewing in combination with the target. In one aspect, the GUI can be viewed as a hologram within a display of an augmented reality device when viewing the target. In another aspect, the GUI can be projected upon the target.

In one example, the NDT measurements can be overlaid at the location where the NDT measurements are acquired. Beneficially this display of the NDT measurements allows an inspector/trainee to more easily relate the NDT measurements to the target. In another example, the NDT measurements can be displayed in the same field of view as the target (e.g., within a separate window adjacent to the target). Beneficially, displaying the GUI in such fashion allows the inspector to view the testing environment, including the target and probe, concurrently with the NDT measurements, eliminating the need to carry the controller to view the NDT measurements.

In an embodiment, a non-destructive testing NDT system is provided and can include a portable non-destructive testing (NDT) probe and a controller. The NDT probe can be configured to generate incident signals directed to a target and to detect return signals resulting from interaction of the incident signals with the target. The controller can include one or more processors in communication with the NDT probe. The controller can be configured to receive the detected return signals from the NDT probe. The controller can also be configured to determine at least one NDT measurement from the detected return signals. The controller can also be configured to receive, from a wearable augmented reality device, a plurality of digital images of a field of view (FOV) including at least one of the target and the NDT probe captured by the augmented reality device. The controller can additionally be configured to identify the location of at least one of the target and the NDT probe within the FOV based upon one or more of the plurality of digital images. The controller can further be configured to generate a graphical user interface (GUI). The GUI can be configured for viewing as a hologram within a display of the augmented reality device and it can include a representation of the at least one NDT measurement that is positioned at a predetermined location with respect to the location of at least one of the target and the NDT probe. The controller can also be configured to output the generated GUI to the augmented reality device.

In another embodiment, the NDT probe is an ultrasonic probe or an eddy current probe.

In another embodiment, the controller can be configured to identify the location of at least one of the target and the NDT probe using a trained machine vision model.

In another embodiment, the controller can be configured to identify the location of at least one of the target and the NDT probe by receiving the location of the target and/or the NDT probe from the augmented reality device.

In another embodiment, the predetermined location can be a location on the target at which the at least one NDT measurement is detected.

In another embodiment, the predetermined location of the at least one NDT measurement can be distanced from the target.

In another embodiment, the controller can be further configured to control at least one of operating parameters of the NDT probe and display parameters of the at least one NDT measurement. The GUI can further include a virtual control panel having at least one user interface object operative to control a selected one of the operating parameters and the display parameters in response to selection.

In another embodiment, the NDT system can include the augmented reality device.

In an embodiment, a method of non-destructive testing is provided. The method can include detecting, by a portable non-destructive testing (NDT) probe, return signals resulting from interaction of incident signals generated by the probe and directed to a target. The method can further include receiving, one or more processors of a controller in communication with the NDT probe, the detected return signals from the NDT probe. The method can additionally include determining, by the one or more processors, at least one NDT measurement from the detected return signals. The method can also include receiving, by the one or more processors from a wearable augmented reality device, a plurality of digital images of a field of view (FOV) including the NDT probe and the target captured by the augmented reality device. The method can further include identifying, by the one or more processors, the location of at least one of the target and the NDT probe within the FOV based upon one or more of the plurality of digital images. The method can additionally include generating, by the one or more processors, a graphical user interface (GUI). The GUI can be configured for viewing as a hologram within a display of the augmented reality device. The GUI can include a representation of the at least one NDT measurement that is positioned at a predetermined location with respect to at least one of the target and the NDT probe. The method can also include outputting the generated GUI to the augmented reality device.

In another embodiment, the NDT probe can be an ultrasonic probe or an eddy current probe.

In another embodiment, the method can further include identifying the location of at least one of the target and the NDT probe using a trained machine vision model.

In another embodiment, the method can further include identifying the location of at least one of the target and the NDT probe by receiving the location of the target of the NDT probe and/or the target from the augmented reality device.

In another embodiment, the predetermined location can be a location on the target at which the at least one NDT measurement is detected.

In another embodiment, the predetermined location of the at least one NDT measurement can be distanced from the target.

In another embodiment, the controller can be further configured to control at least one of operating parameters of the NDT probe and display parameters of the at least one NDT measurement. The GUI can further include a virtual control panel including at least one user interface object operative to control a respective one of the operating parameters and display parameters in response to selection.

In an embodiment, a non-destructive testing NDT system is provided and can include a non-destructive testing (NDT) probe, a computing device, and an encoder. The NDT probe can be configured to generate incident signals directed to a target and to detect return signals resulting from interaction of the incident signals with the target. The computing device can include one or more processors in communication with the NDT probe. The encoder can be in communication with the computing device and it can be configured to output one or more encoder signals including data representing a position of the target with respect to the NDT probe. The computing device can be further configured to receive the detected return signals from the NDT probe. The computing device can also be configured to determine an NDT measurement from the detected return signals. The computing device can additionally be configured to receive a plurality of digital images of a field of view (FOV) that includes the NDT probe and the target captured by a camera. The computing device can also be configured to receive the encoder signals from the encoder. The computing device can be further configured to identify the location of the target and the NDT probe within the FOV based upon one or more of the plurality of digital images. The computing device can also be configured to determine the position on the target corresponding to the NDT measurement based upon the encoder signals. The computing device can additionally be configured to generate a graphical user interface (GUI) including a representation of the NDT measurement configured to overly the determined corresponding position of the target. The computing device can also be configured to output the generated GUI for display.

In another embodiment, the GUI can be configured for viewing as a hologram within a display of an augmented reality device including the camera. The system can further include the augmented reality device.

In another embodiment, the GUI is configured for display within a projection upon the target by a projector. The system can further include the projector.

In another embodiment, the NDT probe can be an ultrasonic probe or an eddy current probe.

In another embodiment, the computing device can be further configured to identify the location of at least one of the target and the NDT probe using a trained machine vision model.

In another embodiment, the predetermined location of the at least one NDT measurement can be distanced from the target.

In another embodiment, the computing device can be further configured to control at least one of operating parameters of the NDT probe and display parameters for the at least one NDT measurement. The GUI can further include a virtual control panel having at least one user interface object operative to control a respective one of the operating parameters and display parameters in response to selection.

In an embodiment, a method of non-destructive testing is provided. The method can include detecting, by a non-destructive testing (NDT) probe, return signals resulting from interaction of incident signals generated by the probe and directed to a target. The method can also include receiving, by a computing device including one or more processors in communication with the NDT probe, the detected return signals from the NDT probe. The method can further include determining, by the one or more processors, at least one NDT measurement from the detected return signals. The method can additionally include receiving, by the one or more processors, a plurality of digital images of a field of view (FOV) that includes the NDT probe and the target captured by a camera. The method can also include receiving, by the one or more processors, one or more encoder signals output by an encoder in communication with the computing device. The encoder signals can include data representing a position of the target with respect to the NDT probe. The method can further include identifying, by the one or more processors, the location of the target and the NDT probe within the FOV based upon one or more of the plurality of digital images. The method can additionally include determining, by the one or more processors, the position on the target corresponding to the NDT measurement based upon the encoder signals. The method can also include generating a graphical user interface (GUI) including a representation of the NDT measurement configured to overly the determined corresponding position of the target. The method can further include outputting the generated GUI for display.

In another embodiment, the GUI can be configured for viewing as a hologram within a display of an augmented reality device including the camera. computing device In another embodiment, the GUI is configured for display within a projection upon the target by a projector.

In another embodiment, the NDT probe can be an ultrasonic probe or an eddy current probe.

In another embodiment, the method can further include identifying the location of at least one of the target and the NDT probe using a trained machine vision model.

In another embodiment, the predetermined location of the at least one NDT measurement can be distanced from the target.

In another embodiment, the computing device can be further configured to control at least one of operating parameters of the NDT probe and display parameters for the at least one NDT measurement. The GUI can further include a virtual control panel having at least one user interface object operative to control a respective one of the operating parameters and display parameters in response to selection.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Non-destructive testing (NDT) systems, such as ultrasonic and eddy current testing systems, are commonly used for inspection of target objects such as machine components to identify and measure defects. Some NDT systems can display the test results to an inspector in real time on a display such as a computer monitor or tablet computing device. However, it can be difficult for an inspector to relate the test results to the geometry of the target object being inspected, reducing the quality of reported test results. Furthermore, some portable testing systems can require an inspector to carry the NDT system (e.g., probe and display), which can occupy both hands of the inspector. This can raise the risk of inspector injury in environments where the inspector may need to use their hands for stabilization (e.g., testing at locations accessed by an inspector using support ropes).

Accordingly, systems and methods for non-destructive testing are provided that improve visualization of NDT measurements. Graphical user interfaces can be generated that include NDT measurements. The GUIs can be viewed as holograms within a display of an augmented reality device, such as a headset or projected onto a target. The GUI can place the NDT measurements at desired location with respect to the target. In one example, the NDT measurements can be displayed within a window distanced from the target. In another example, the NDT measurements can be displayed as an overlay upon the target at the location where NDT measurements are acquired. In this manner, an inspector can view NDT measurements that are accurately correlated with the location on the target at which the NDT measurements were made, providing easier interpretation of NDT measurements and attendant reporting. Display of NDT measurements in combination with the target can further free the hands of the inspector, improving safety.

Certain embodiments of the present disclosure discuss non-destructive testing devices with specific reference to ultrasonic or and eddy current testing devices. However, embodiments of the disclosure can be employed with other non-destructive testing devices, without limit.

Figure 1:
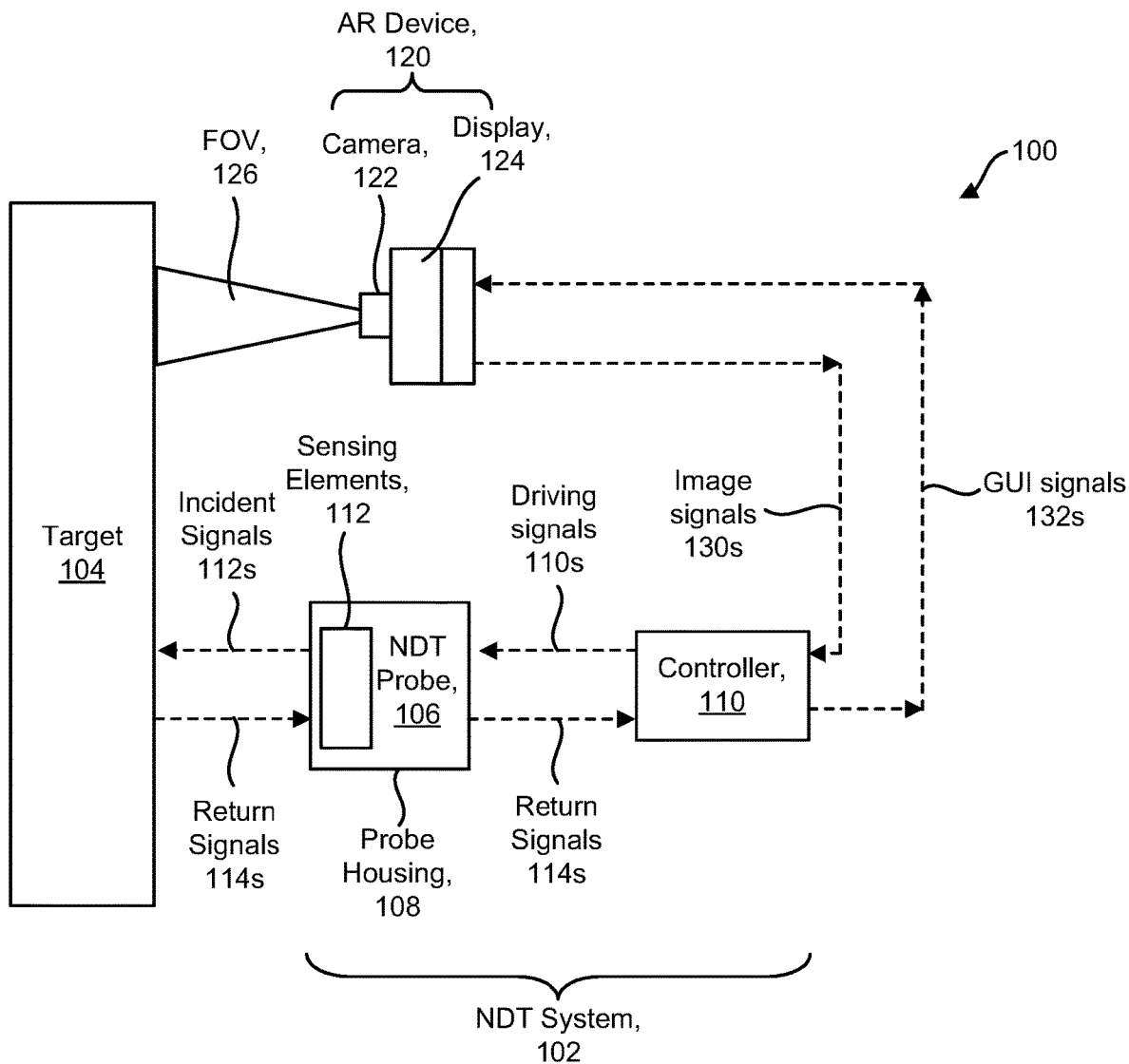
FIG. 1 is a block diagram illustrating a first exemplary embodiment of an operating environment including a non-destructive testing (NDT) system configured to generate graphical user interfaces (GUI) including NDT measurements for viewing as a hologram within a display of an augmented reality device.

FIG. 1 illustrates one exemplary embodiment of an operating environment 100 containing a non-destructive testing (NDT) system 102 and a target 104. As shown, the NDT system 102 includes a NDT probe 106 and a controller 110. The NDT probe 106 includes a housing 108 containing one or more sensing elements 112. The controller 110 is in signal communication with the NDT probe 106.

In certain embodiments, the NDT system 102 can be a portable system. As an example, the NDT probe and the controller 110 can be configured to be held by an inspector. For instance, the controller 110 can be a portable computing device including one or more processors and a display, such as a laptop, a tablet, a smartphone, etc. However, the NDT system can be provided in other form factors, as necessary.

Examples of the target can include, but are not limited to, vehicle components (e.g., components of aircraft, trains, etc.), components of industrial equipment such as that employed in oil and gas industries (e.g., pumps, compressors, turbines, pipes, etc.) and the like. Specific examples of the target can include train wheels, rails, and shafts. It can be appreciated, however, that reference to specific targets herein is for example only and the disclosed embodiments can be employed with any target without limit.

In an embodiment, the NDT system 102 can be an ultrasonic testing system, where the NDT probe 106 is an ultrasonic probe and the one or more sensing elements 112 are ultrasonic transducers. The ultrasonic transducers can be configured to generate respective ultrasonic waves, referred to herein as an incident ultrasonic signals 112s or incident signals 112s, having predetermined characteristics in response to driving signals 110s received from the controller 110. The ultrasonic transducers can also be configured to detect ultrasonic waves reflected back to the NDT probe 106 from the target 104, referred to herein as return ultrasonic signals 114s or return signals 114s.

In an alternative embodiment, the NDT system 102 can be an eddy current testing system where the NDT probe 106 is an eddy current probe and the one or more sensing elements 112 are coils of conductive wire. The coils can be configured to generate an alternating magnetic field in response to driving signals 110s (e.g., alternating electrical current) received from the controller 110. The generated magnetic field can induce an eddy current within electrically conductive targets 104. The eddy current probe can be moved with respect to the target during testing. If eddy current circulation is disturbed by a flaw, magnetic coupling with the eddy current probe is changed and return signal 114s in the form of defect signals can be read by measuring variation in the coil impedance.

In either case, the NDT probe 106 can be positioned proximate to the target 104 (e.g., in contact with or near the target 104) for detecting the return signals 114s. The detected return signals 114s are subsequently transmitted to the controller 110. In one example, the NDT measurements can be the detected return signals 114s without further processing. In another example, the controller 110 can process the detected return signals 114s to determine the NDT measurements. Processing can include, but is not limited to, signal processing of the return signals 114s, analysis of the return signals 114s according to one or more models, and the like. As an example, ultrasonic NDT measurements can include one or more of ultrasonic amplitude as a function of time (A-scans), and ultrasonic amplitude as a function of position (C-scan), time-displacement scans (TD scans). Eddy current NDT measurements can include defect signal amplitude (e.g., voltage) as a function of position and inductive reactance as a function of coil resistance.

As further shown in FIG. 1, the controller 110 is in communication with an augmented reality (AR) device 120. In an embodiment, the AR device 120 is a wearable device, such as a headset (e.g., Microsoft HoloLens®), and includes a camera 122 and a display 124. The camera 122 can be configured to capture a plurality of digital images (e.g., video and/or a plurality of still frames) of the target 104 within a field of view (FOV) 126. In certain embodiments, the FOV 126 can include at least a portion of the target 104. In further embodiments, the FOV 126 can include at least a portion of the target 104 and at least a portion of the NDT probe 106. The captured digital images can be transmitted to the controller 110 via image signals 130s.

The controller 110 can be further configured to generate and transmit graphical user interfaces GUIs to the AR device 120 (e.g., via GUI signals 132s) for viewing as a hologram within the display 124. As discussed in greater detail below, the GUIs can include a representation of the NDT measurements. The captured digital images can be analyzed by the controller 110 to identify selected objects within the digital images (e.g., the target 104, the NDT probe 106) and generate GUIs that place the NDT measurements within the FOV 126 at a predetermined location with respect to the target 104.

Providing GUIs that allow for viewing of the NDT measurements within the FOV 126 of the AR device 120 can provide a variety of benefits. In one aspect, the need to view the NDT measurements displayed by the controller 110 can be reduced or entirely eliminated, extending battery life. In another aspect, under circumstances where the NDT probe 106 and the controller 110 are handheld devices, display of the NDT measurements within the FOV 126 of the AR device 120 can further free the hands of the inspector and reduce risk of injury. In a further aspect, using the AR device 120 to display the NDT measurements as an overlay upon the target 104 at the location at where the NDT measurements are acquired can facilitate training, as it can be difficult to explain how ultrasonic or magnetic signals travel within the target 104 or how to relate NDT measurements with the target 104 under inspection.

In an additional aspect, using the AR device to display the NDT measurements as an overlay upon the target 104 at the location at where the NDT measurements are acquired can facilitate improved reporting. Traditional inspection approaches can require inspectors to report NDT measurements by paper or computer entry, which can be difficult to relate to the target 104. By visually recording the act of inspection and mapping the NDT measurements to the corresponding location of the target 104, errors in reporting the location of the target 104 at which NDT measurements are made can be reduced.

Figure 2:
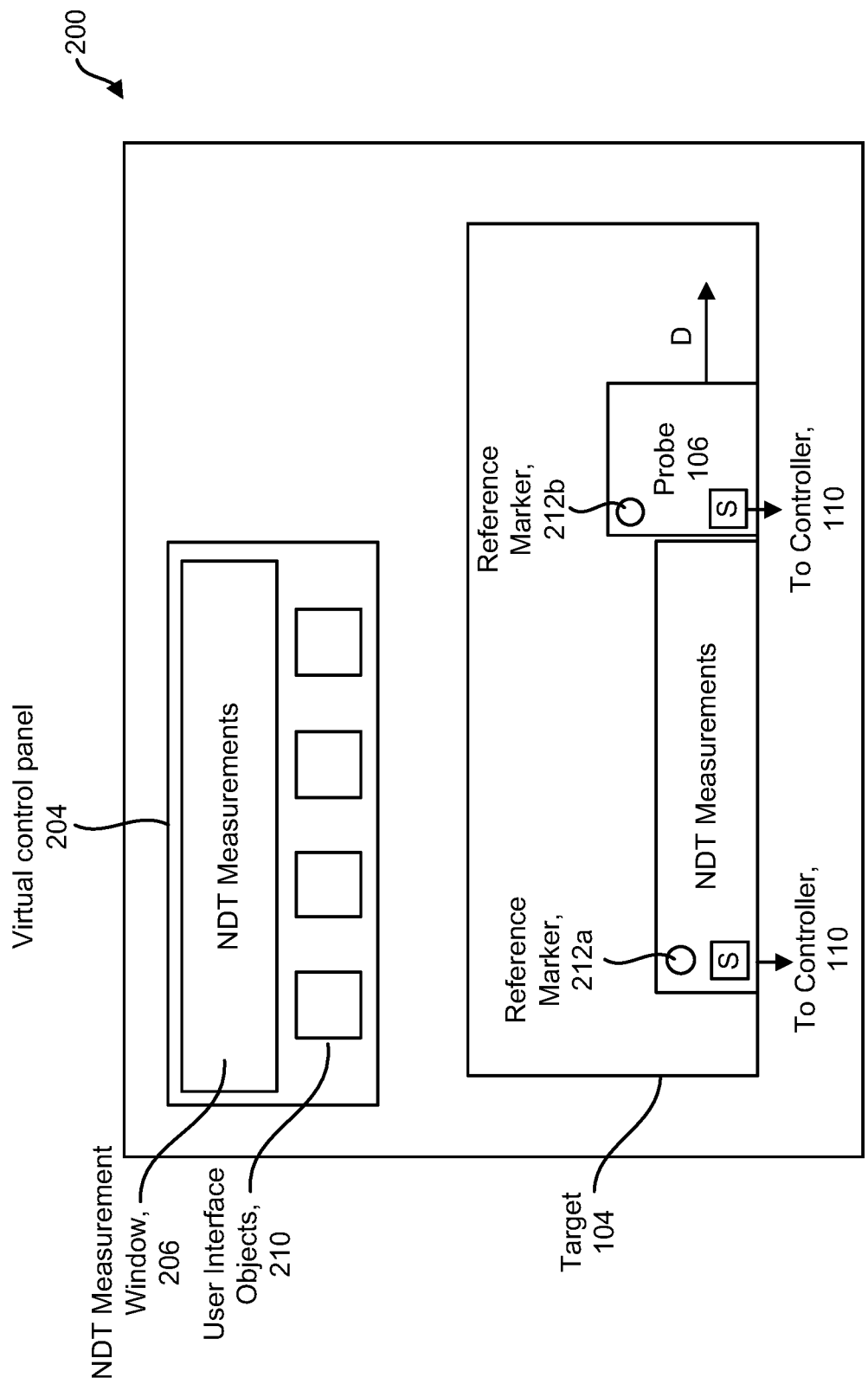
FIG. 2 is a schematic diagram illustrating an exemplary embodiment of an augmented reality scene including a GUI generated by the system of FIG. 1 and an inspection target.
Figure 3:
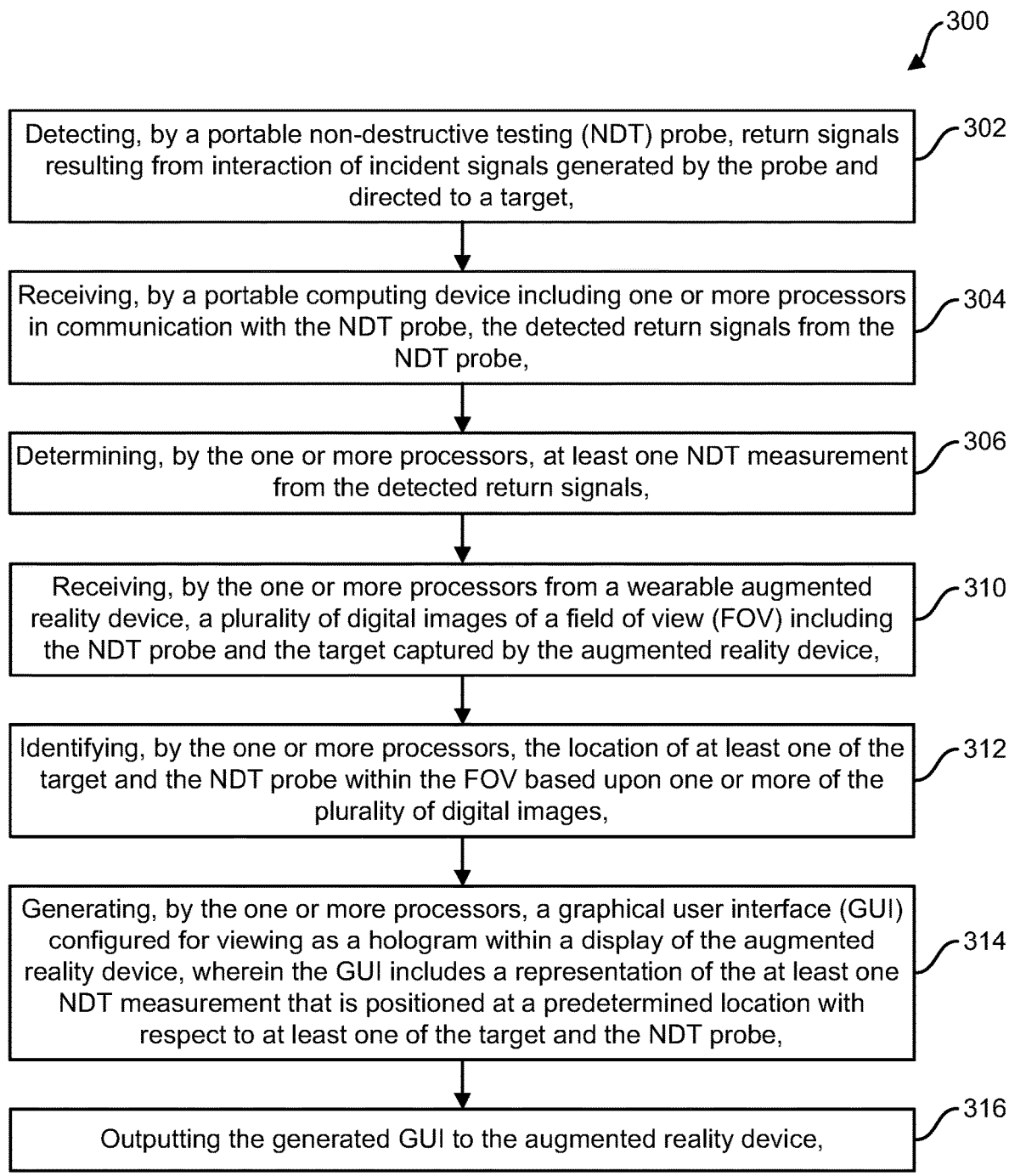
FIG. 3 is a flow diagram illustrating one exemplary embodiment of a method for generating the GUI of FIG. 2.

FIG. 2 is a schematic illustration of an AR scene 200 including the target 104 and the NDT probe 106 and one exemplary embodiment of a GUI generated by the controller 110. The target 104 and NDT probe 106 can be in the background of the FOV 126 of the AR device 120 while the GUI can be a hologram displayed in the foreground by the display 124 of the AR device 120. A method 300 employing the NDT system 102 for generation of the GUI is illustrated in FIG. 3. As shown, the method 300 includes operations 302-316. However, it can be understood that embodiments of the method 300 can include greater or fewer operations than illustrated in FIG. 3 and the operations can be performed in a different order than illustrated in FIG. 3.

In operation 302, return signals resulting from interaction of the incident signals 112s with the target 104 can be detected by the NDT probe 106. The NDT probe 106 can be a portable NDT probe dimensioned to be held by the inspector and moved by hand. Examples of the NDT probe 106 can include, but are not limited to, ultrasonic probes and eddy current probes.

In operation 304, one or more processors of the controller 110 can receive the detected return signals 114s from the NDT probe 106. In certain embodiments, the controller 110 can be a portable computing device. The controller 110 can communicate with the NDT probe 106 via wires or wirelessly (e.g., Bluetooth® or other wireless communication protocols) to receive the return signals 114s acquired by the NDT probe 106.

In operation 306, one or more processors of the controller 110 can determine one or more NDT measurements from the received return signals 114s. In the context of ultrasonic probes, the NDT measurements can be ultrasonic scans (e.g., A-scans, C-scans). In the context of eddy current probes, the NDT measurements can be defect signal amplitude (e.g., voltage) as a function of position and inductive reactance as a function of coil resistance.

In operation 310, one or more processors of the controller 110 can receive a plurality of digital images from the AR device 120. The digital images can be the FOV 126 captured by the camera 122 of the AR device 120 and can include at least the target 104. In further embodiments, as shown in FIG. 2, the plurality of digital images can include the target 104 and the NDT probe 106. As discussed above, the NDT probe 106 can be a hand-held probe that is moved by the inspector. However, for clarity, the inspector's hand is omitted from FIG. 2.

In operation 312, the one or more processors of the controller 110 can be configured to identify the location of at least one of the target 104 and the NDT probe 106 within the FOV 126 based upon one or more of the received digital images. It can be appreciated that this identification is necessary to generate GUIs that place the NDT measurements within the FOV 126 at a predetermined location with respect to at least one of the target 104 and the NDT probe 106. In further embodiments, discussed below, the one or more processors can correlate the NDT measurements with the physical location on the target 104 at which the corresponding return signals 114s are detected.

The location of the target 104 within the FOV 126, alone or in combination with the location of the NDT probe 106, can be determined in a variety of ways. In one embodiment, the location of the target 104 and/or the NDT probe 106 can be determined by the controller 110. As an example, the controller 110 can receive CAD data representing the shape of target 104 and/or the NDT probe 106. The CAD data and one or more of the captured images can be input to a trained machine vision model executed by the controller 110. The machine vision model can be previously trained using a training data set of inspection targets and NDT probes expected to be employed for non-destructive testing. Thus, execution of the trained machine vision model can identify the location of the target 104 and/or the NDT probe 106 based upon one or more of the received images.

In alternative embodiments, the target 104 and the NDT probe 106 can include respective reference markers 212a, 212b for identification. As an example each of the reference markers 212a, 212b can include at least one unique feature (e.g., size, shape, color, pattern, barcode, etc.) A machine vision model can be trained using a training data set including different reference markers 212a, 212b. Respective reference markers 212a, 212b can be correlated to targets 104 and/or NDT probes 106 (e.g., using a lookup table). Thus, execution of this trained machine vision model can identify the target 104 and/or NDT probe 106 based upon one or more of the received plurality of received images.

In a further embodiment, the inspector can use the AR device 120 to identify the shape of the target 104 and the NDT probe 106 within one or more of the plurality of images. This identification can be provided to the controller 110. As successive images are subsequently received by the controller 110, the target 104 and/or NDT probe 106 can be tracked by the controller 110 based upon the identified shape.

It can be understood that, in additional embodiments, any of the above-discussed techniques for determination of the location of the NDT probe and the target within the FOV can be performed by the AR device, alone or in combination with the controller.

In operation 314, the one or more processors can generate the GUI for viewing as a hologram within the display 124 of the AR device 120. The GUI can include a representation of the at least one NDT measurement positioned at a predetermined location with respect to the target 104. In one embodiment, the NDT measurements can be displayed within an NDT measurement window 206 distanced from the target 104.

The controller 110 can be configured to control operating parameters of the NDT probe 106 and/or display of NDT measurements using physical and virtual keys. Examples of operating parameters can include, but are not limited to, power, NDT test start/stop, and parameters of the incident signals 112s (e.g., amplitude, frequency, timing, etc.). NDT display options can include, but are not limited to, NDT measurement selection by axis, axis units, axis scales (magnitude, linear/logarithmic/exponential), and the like.

To avoid the need for the inspector to hold and/or view the controller 100 for selection of operational and/or display parameters during inspection, embodiments of the GUI can include a virtual control panel 204. The virtual control panel 204 can be configured to duplicate the appearance and/or functionality of a control panel provided by the controller 110. As an example, the virtual control panel 204 include one or more user interface objects 210. configured to replicate the functionality of respective physical and virtual keys of the controller 110. Beneficially, using the AR device 120 rather than the controller 110 for control of the NDT system 102, the inspector can avoid the need to view the controller 110. The virtual control panel 204 can further include the NDT measurement window 206.

The virtual control panel 204 can be displayed at a predetermined location with respect to the target 104. In one aspect, the predetermined location can be a specified distance between one or more reference points or features (e.g., edges, corners, etc.) of the target 104 and the virtual control panel 204 (e.g., a minimum distance, an absolute distance). In another example, the predetermined location can be within a specified region of the scene 200 (e.g., any portion of the scene 200 that does not overlap the target). Such distances and/or regions can be specified by the inspector via input from the controller 110 and/or AR device 120 or by pre-programmed defaults.

In an alternative embodiment, the GUI can represent the NDT measurements within the scene 200 as an overlay upon the target 104. That is, the predetermined location of the NDT measurements with respect to the target 104 can correspond to the location of the target 104 at which the return signals 114s corresponding to the NDT measurements are detected. As an example, illustrated in FIG. 2, in the context of an ultrasonic testing system, the NDT measurements can be an ultrasonic C-scan of amplitude as a function of position. As the NDT probe 106 is moved along the surface of the target 104 within the FOV, shown as arrow D, the GUI can include the NDT measurements projected along the path traveled by the NDT probe 106.

The location of the target 104 and the NDT probe 106 can be determined as a function of time using the captured images as discussed above. The time at which the return signals 114s corresponding to the NDT measurements are detected can also be recorded by the NDT probe 106. Accordingly, with this information, time can be used to correlate the NDT measurements at respective positions of the NDT probe 106.

It can be appreciated that machine vision can estimate the location of the target 104 and/or the NDT probe 106 within the FOV 126 within a certain level of uncertainty. However, if more precise estimates are desired, other techniques can be employed to determine the location of the target 104 and/or the NDT probe 106 within the FOV 126 as a function of time. As an example, the target 104 and the NDT probe 106 can include respective sensors S configured to output data from which position and/or orientation can be determined. Such sensors S can include, but are not limited to accelerometers, gyroscopes, encoders and the like. The output of the sensors S can be transmitted to the controller 110 for determination of the location of the target 104 and NDT probe 106 within the FOV 126.

This visualization can provide a number of benefits, in addition to those discussed above. In one aspect, the inspection path traveled by the NDT probe 106 can be clearly displayed so that portions of a defined region of the target 104 under inspection are not missed. In another aspect, features detected based upon the NDT measurements can also be displayed within the GUI. Visualizing potential defects in real time on the target 104 can help to accurately focus the inspector's attention on these regions of the target 104.

Figure 4A:
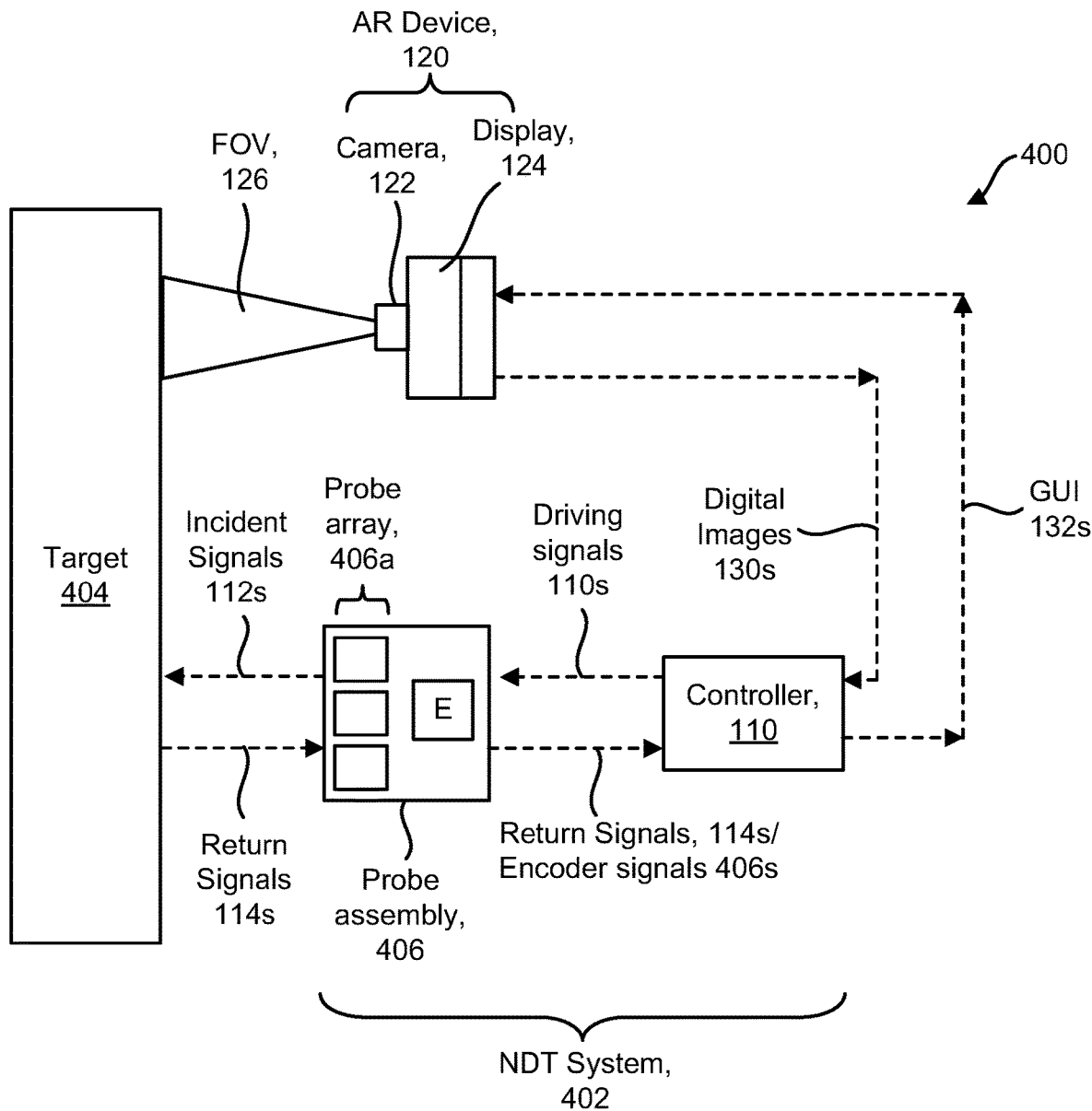
FIG. 4A is a block diagram illustrating a second exemplary embodiment of an operating environment including another non-destructive testing (NDT) system configured to generate graphical user interfaces (GUI) including NDT measurements for viewing as a hologram within a display of an augmented reality device.

FIG. 4A is a schematic block diagram of an operating environment 400 containing another exemplary embodiment of an NDT system 402 and a target 404. The NDT system 402 can be similar to the NDT system 102 of FIG. 1 with the addition of an encoder E in communication with the controller 110. As discussed in greater detail below, the encoder E can be employed to determine the portion of the target 404 corresponding to respective NDT measurements.

In an embodiment discussed below, the NDT system 402 replaces the NDT probe 106 with an NDT probe assembly 406 including a plurality of NDT probes 406a (e.g., ultrasonic probes and eddy current probes, etc.) The NDT system 402 can be further fixed in place and configured to move the target with respect to the NDT system 402 during inspection. As an example, the target 404 can be in the form of a train wheel 404. It can be appreciated, however, that alternative embodiments of the NDT system of FIG. 4A can employ the NDT probe 106 in combination with the encoder E.

Figure 4B:
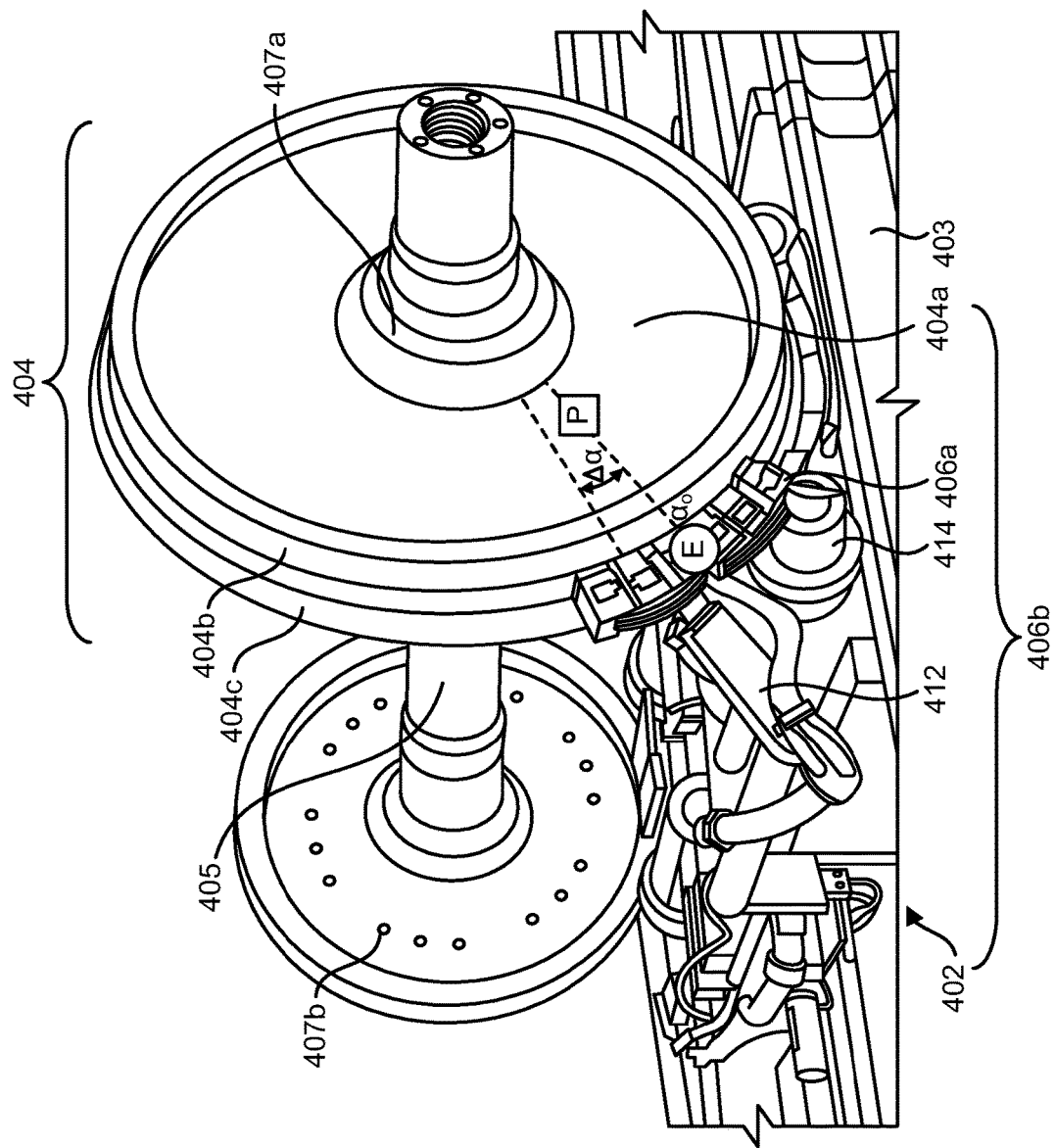
FIG. 4B is a schematic diagram illustrating an NDT probe configured for inspection of train wheels.

The train wheel 404 is illustrated in greater detail in FIG. 4B. As shown, the train wheel 404 is connected to an axle 405 and positioned on rails 403. The train wheel 404 includes a wheel disk 404a, a running tread 404b, and a wheel flange 404c. The wheel disk 404a can form a center of the train wheel 404 and the running tread 404b can form a circumferential outer surface of the train wheel 404. The wheel flange 404c can be formed on one side of the train wheel 404 (e.g., an interior side) and extend radially outward from the running tread 404b. A primary hole 407a can be positioned at about a center of the wheel disk 404a and be configured for receipt of the axle 405 therethrough. One or more secondary holes 407b can be formed within the wheel disk 404a, positioned radially outward from the primary hole 407a. The secondary holes 407b can be configured for coupling other components to the train wheel 404, such as brake disks (not shown).

The NDT probe assembly 406 is also illustrated in detail in FIG. 4B. The NDT probe assembly 406 includes the plurality of NDT probes 406a (e.g., arranged in an array), and a probe positioning assembly 406b. The probe positioning assembly 406b can include a probe holder 410, a probe holder mount 412, and a lift and rotation unit 414. A predetermined number of the NDT probes 406a can be mechanically coupled to the probe holder 410 and oriented with respect to one another by the probe holder 410 (e.g., in an arcuate configuration mimicking a curvature of the running tread 404b). Each probe holder 410 in turn can be coupled to the probe holder mount 412.

When using the NDT system 402 for inspection of the train wheel 404, the lift and rotation unit 414 can lift the train wheel 404 above the underlying rail 403 and rotate the train wheel 404 about an axis extending through the primary hole 407a (e.g., via one or more rotation wheels 416). The probe holder mount 412 can be coupled to the probe holder 410 and it can be configured to position the plurality of NDT probes 406a adjacent to, or in contact with, the running tread 404b to direct incident signals 112s to train wheel 404 and receive return signals 114s while lifted.

Similar to the NDT system 102, the return signals 114s can be received by the controller 110 for preparation of NDT measurements. The NDT measurements can be in the form of as-detected return 114s or detected return signals 114s after processing (e.g., signal processing and/or further analysis), as discussed above.

Figure 4C:
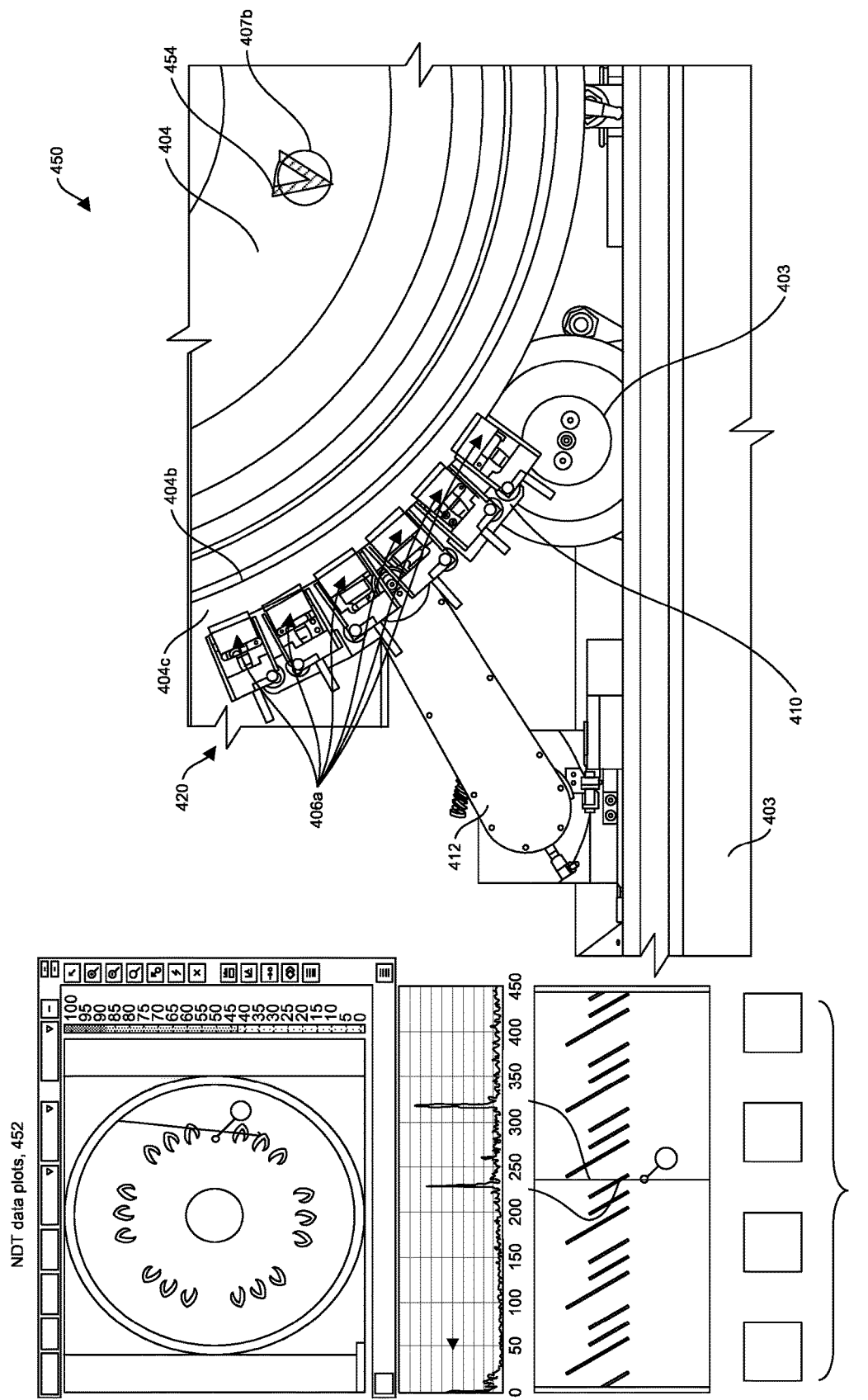
FIG. 4C is a schematic diagram illustrating an augmented reality scene including an exemplary embodiment of a GUI generated by the system of FIGS. 4A-4B including the target.

As further discussed above with respect to FIG. 1, the controller 110 is in communication with the augmented reality (AR) device 120 and is configured to generate GUIs for viewing the NDT measurements at a predetermined location within the display 124 of the NDT device 102. FIG. 4C is a side view of an AR scene 450 including the train wheel 404 and NDT probe assembly 406 and one exemplary embodiment of a GUI generated by the controller 110. The train wheel 404 and NDT probe assembly 406 can be in the background of the FOV 126 of the AR device 120 while the GUI can be a hologram displayed by the display 124 of the AR device 120.

The controller 110 can employ object identification techniques, as discussed above, to identify the location of the train wheel 404 the NDT probe assembly 406 within the FOV 126 based upon one or more of the captured digital images. The controller 110 can be further configured to position the NDT measurements at a predetermined location within the FOV 126. As shown in FIG. 4C, in one embodiment, the GUI can represent the NDT measurements as one or more data plots 452 within the AR scene 450. The data plots 452 can be distanced from the train wheel 404 by a predetermined distance. The GUI can further include user interface objects 210 configured to replicate the functionality of respective physical and virtual keys of the controller 110

In another embodiment, the GUI can represent the NDT measurements in an overlay 454 upon the train wheel 404. The overlay 454 can be configured to position the NDT measurements at the location(s) on the train wheel 404 at which the return signals 114s corresponding to the NDT measurements are detected.

The controller 110 can employ object identification techniques, as discussed above, to identify the location of the train wheel 404 and the NDT probe assembly 406 within the FOV 126 based upon one or more of the plurality of received images. Once the location of the train wheel 404 and the NDT probe assembly 406 are identified, by the controller 110, the location(s) of the train wheel 404 corresponding to the NDT measurements can be determined by the controller 110 with respect to the using an encoder E (e.g., a rotary encoder).

The encoder can include the encoder E (e.g., a sensor) mounted to the NDT probe assembly 406 and an encoding (not shown) mounted to the train wheel 404 that is detectable by the encoder E. As the train wheel 404 is rotated, the encoder E detects respective encodings. Upon detection of an encoding, the encoder E can output a corresponding encoder signal 406s including data representing the detected encoding.

Locations on the train wheel 404 can be defined by an angle and distance from a reference point. As an example, the reference point can be a point on the plurality of NDT probes 406a adjacent to the encoder E.

The angle can be determined using the encoder E. As an example, the time at which each encoder signal 406s is detected can be recorded, identifying the time at which a portion P of the train wheel 404 including the encoding corresponding to the encoder signal 406s is adjacent to the encoder E (e.g., angle $\alpha$ with respect to a reference angle $\alpha_o$). Rotational speed of the train wheel 404 can be determined by the controller 110 based upon the time interval between detection of a given encoder signal 406s and/or by knowledge of the rotational speed of the rotation wheels 416. An angular offset ($\Delta\alpha$) between respective NDT probes 406a from the reference point (e.g., a point on a selected NDT probe of the plurality of NDT probes 406a) can be known by the controller 110 (e.g., via inspector input). Using the rotational speed of the train wheel 404 and the angular offset $\Delta\alpha$, the time at which a respective portion of the train wheel 404 is adjacent respective ones of the plurality of NDT probes 406a can be determined.

The distance can be determined from the NDT measurements. Specifically, the distance between a respective NDT probe 406a of the NDT probe assembly 406 and a feature captured in the NDT measurements is given by the time of flight for the feature and the speed of sound within the train wheel 404.

Once the controller 110 has determined the angle and distance of the NDT measurement from the reference point, the controller 110 can further generate and transmit the GUI to the AR device 120 for viewing as a hologram within the display 124 of the AR device.

Figure 5:
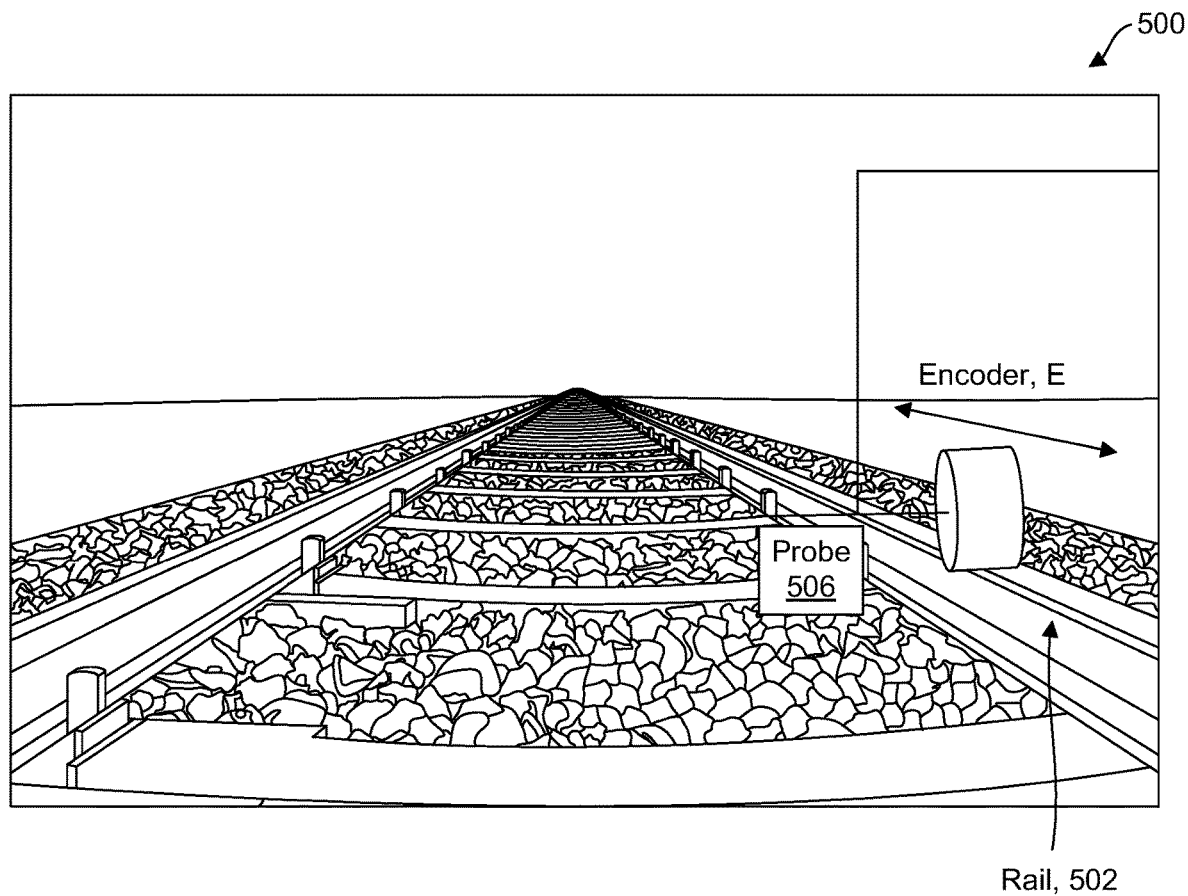
FIG. 5 is a diagram illustrating another exemplary embodiment of a GUI generated the system of FIG. 1 in the context of ultrasonic testing of railway rails using a rail-mounted NDT probe.

While the discussion above refers to inspection of train wheels 404, the disclosed embodiments can be used for inspection of other targets without limit. As an example, FIG. 5 illustrates an AR scene 500 illustrating an embodiment of the NDT system 402 configured to perform NDT inspection of a rail 502 including an NDT probe assembly 506 including one or more NDT probes and encoder E (the controller is omitted for clarity). As shown, the encoder E is mounted to the NDT probe 506. During inspection, the NDT system 402 can be moved along the length of the rail 502. The rail can include encodings such that the encoder signals output by the encoder E and received by the controller can be used to determine the location on the rail 502 corresponding to respective NDT measurements.

Figure 6:
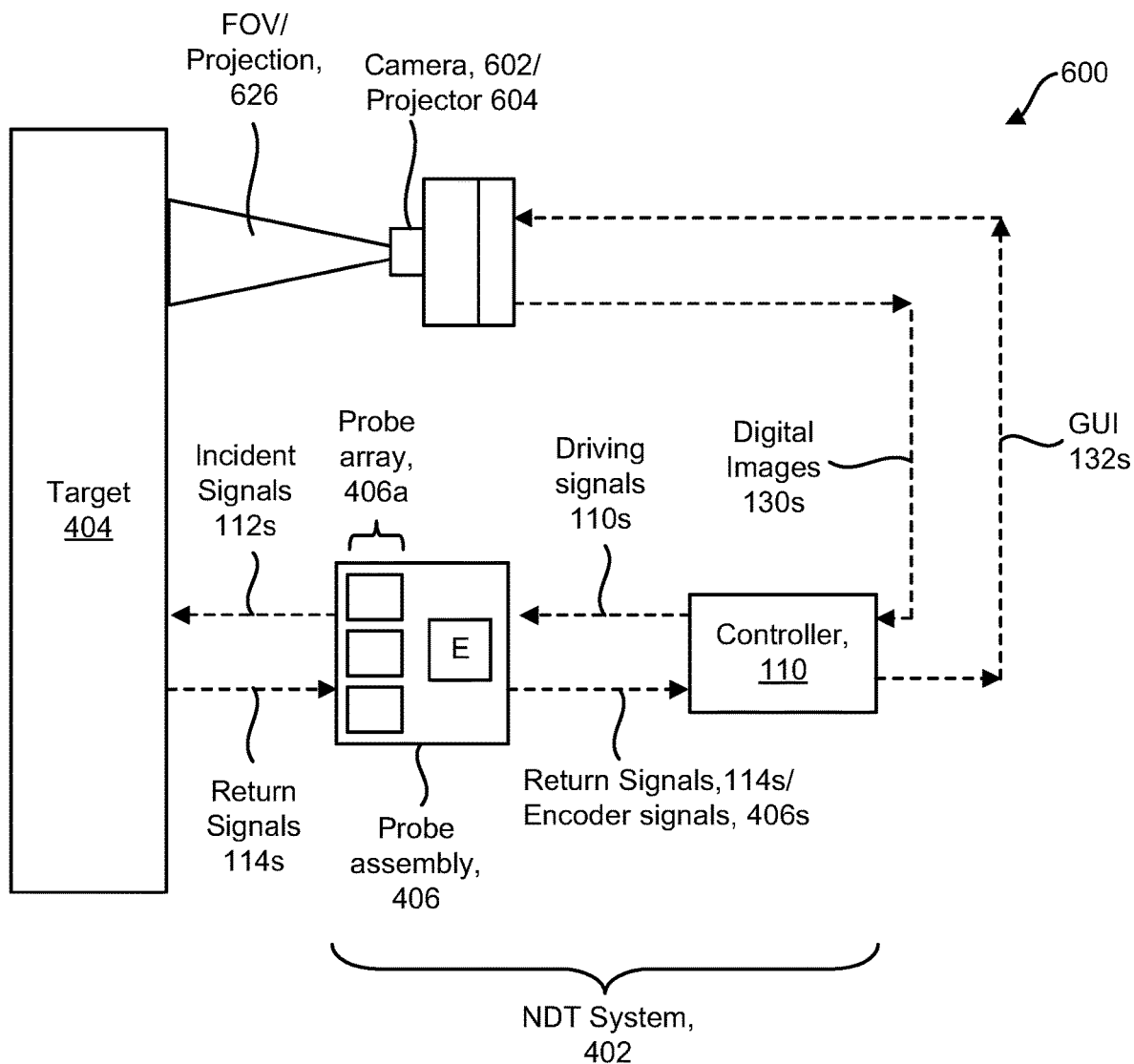
FIG. 6 is a block diagram illustrating a third exemplary embodiment of an operating environment including another non-destructive testing (NDT) system configured to generate graphical user interfaces (GUI) including NDT measurements for projection by a projector.

In further embodiments, the NDT system 402 discussed above can be adapted for use with a projector configured to project the GUI on the target in lieu of the AR device 120 displaying the GUI as a hologram within a display. FIG. 6 is a schematic block diagram of an operating environment 600 containing one exemplary embodiment of the NDT system 402 and the target 404 (e.g., train wheel 404). The operating environment 600 can be similar to the NDT system 102 of FIG. 1 but the AR device 120 is replaced with a camera 602 and a projector 604. The field of view 626 of the camera 602 can be substantially the same as the projection of the GUI generated by the projector 604. Thus, the controller 110 can generate the GUI in a manner similar to that discussed above in the context of FIGS. 4A-4C, except that the GUI is now configured to position the NDT measurements at a predetermined location with respect to the train wheel 404 and/or the plurality of NDT probes 406a within the projection.

Figure 7:
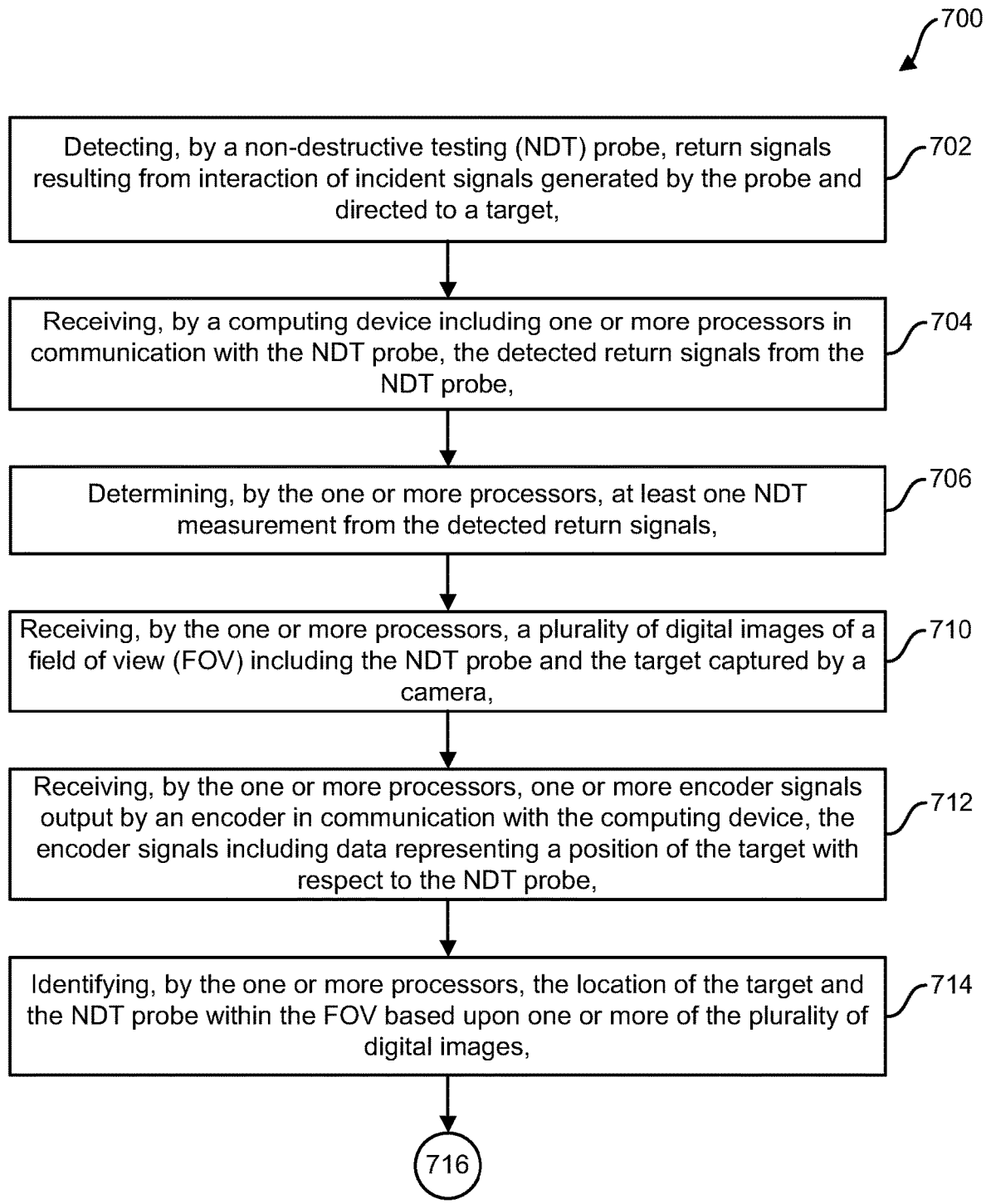
FIG. 7 is a flow diagram illustrating one exemplary embodiment of a method for generating the GUIs employing the NDT systems of FIGS. 4A-4B, 5, and 6.

An embodiment of a method 700 for generation of the GUI by the NDT system 402 is illustrated in FIG. 7. The method 700 can be employed for generation of GUIs by embodiments of the NDT testing system 400 or NDT testing system 600. As shown, the method 700 includes operations 702-722. However, it can be understood that embodiments of the method 700 can include greater or fewer operations than illustrated in FIG. 7 and the operations can be performed in a different order than illustrated in FIG. 7.

In operation 702, return signals 114s resulting from interaction of the incident signals 112s with the target can be detected by the NDT probe assembly 406. Examples of the target 402 can include train wheel 404, rail 502, and the like. Examples of NDT probes employed by the NDT probe assembly 406 can include, but are not limited to, ultrasonic probes and eddy current probes.

In operation 704, one or more processors of the controller 110 can receive the detected return signals 114s from the NDT probes of the NDT probe assembly 406. The controller 110 can communicate with the NDT probe 106 via wires or wirelessly (e.g., Bluetooth® or other wireless communication protocols) to receive the return signals 114s acquired by the NDT probe assembly 406.

In operation 706, one or more processors of the controller 110 can determine one or more NDT measurements from the received return signals 114s. In the context of ultrasonic probes, the NDT measurements can be ultrasonic scans (e.g., A-scans, C-scans, TD-scans), while in the context of eddy current probes, the NDT measurements can include defect signal amplitude (e.g., voltage) as a function of position and inductive reactance as a function of coil resistance.

In operation 710, the one or more processors of the controller 110 can receive a plurality of digital images including at least one of the NDT probe assembly 406 and the target 404 (e.g., train wheel 404). In certain embodiments, the digital images can be received from the AR device 120. In other embodiments, the digital images can be received from the camera 602.

In operation 712, the one or more processors of the controller 110 can receive the encoder signals from the encoder E.

In operation 714, the one or more processors of the controller 110 can identify the location of the train wheel 404 and the NDT probe assembly 406 within the FOV (e.g., FOV 126, 626) based upon one or more of the plurality of digital images.

In operation 716, the one or more processors of the controller 110 can be configured to determine the position on the target 404 (e.g., train wheel 404) that corresponds to respective NDT measurements based upon the encoder signals.

In operations 720-722, the one or more processors of the controller 110 can be configured to generate and output the GUI. The GUI can include a representation of the NDT measurement configured to overly the determined corresponding position of the target. The GUI can be configured for viewing within a hologram within the display 124 of the AR device 120 or within the projection 626 of projector 604 on the target 404 (e.g., train wheel 404).

Exemplary technical effects of the methods, systems, and devices described herein include, by way of non-limiting example improved visualization of NDT measurements. In one aspect, an inspector can view NDT measurements within a display of an augmented reality device, freeing the inspector's hands and reducing the likelihood of accidents. In another embodiment, the GUI can include a representation of the NDT measurements as an overlay upon the location where the NDT measurements were detected. Such an overlay can help inspectors better relate the NDT measurements to the target, improving reporting quality. Such overlays can further assist with training of inspectors.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A non-destructive testing (NDT) system, comprising:
   an NDT probe configured to generate incident signals directed to a target and to detect return signals resulting from interaction of the incident signals with the target;
   a computing device including one or more processors in communication with the NDT probe; and
   an encoder in communication with the computing device and configured to output one or more encoder signals including data representing a position of the target with respect to the NDT probe;
   wherein the computing device is configured to:
      receive the detected return signals from the NDT probe;
      determine an NDT measurement from the detected return signals;
      receive a plurality of digital images of a field of view (FOV) that includes the NDT probe and the target captured by a camera;
      receive the encoder signals from the encoder;
      identify the location of the target and the NDT probe within the FOV based upon one or more of the plurality of digital images;
      determine the position on the target corresponding to the NDT measurement based upon the encoder signals;
      generate a graphical user interface (GUI) including a representation of the NDT measurement configured to overlay the determined corresponding position of the target; and
      output the generated GUI for display.

2. The system of claim 1, wherein the GUI is configured for viewing as a hologram within a display of an augmented reality device including the camera.

3. The system of claim 2, further comprising the augmented reality device.

4. The system of claim 1, wherein the GUI is configured for display within a projection upon the target by a projector.

5. The system of claim 4, further comprising the projector.

6. The system of claim 1, wherein the NDT probe is an ultrasonic probe or an eddy current probe.

7. The system of claim 1, wherein the computing device is further configured to identify the location of at least one of the target and the NDT probe using a trained machine vision model.

8. The system of claim 1, wherein the predetermined location of the at least one NDT measurement is distanced from the target.

9. The system of claim 1, wherein the computing device is further configured to control at least one of operating parameters of the NDT probe and display parameters for the at least one NDT measurement, and wherein the GUI further comprises a virtual control panel comprising at least one user interface object operative to control a respective one of the operating parameters and display parameters in response to selection.

10. A method of non-destructive testing, comprising:
   detecting, by a non-destructive testing (NDT) probe, return signals resulting from interaction of incident signals generated by the probe and directed to a target;
   receiving, by a computing device including one or more processors in communication with the NDT probe, the detected return signals from the NDT probe;
   determining, by the one or more processors, at least one NDT measurement from the detected return signals;
   receiving, by the one or more processors, a plurality of digital images of a field of view (FOV) that includes the NDT probe and the target captured by a camera;
   receiving, by the one or more processors, one or more encoder signals output by an encoder in communication with the computing device, the encoder signals including data representing a position of the target with respect to the NDT probe;
   identifying, by the one or more processors, the location of the target and the NDT probe within the FOV based upon one or more of the plurality of digital images;
   determining, by the one or more processors, the position on the target corresponding to the NDT measurement based upon the encoder signals;
   generating a graphical user interface (GUI) including a representation of the NDT measurement configured to overly the determined corresponding position of the target; and
   outputting the generated GUI for display.

11. The method of claim 10, wherein the GUI is configured for viewing as a hologram within a display of an augmented reality device including the camera.

12. The method of claim 10, wherein the GUI is configured for display within a projection upon the target by a projector.

13. The method of claim 10, wherein the NDT probe is an ultrasonic probe or an eddy current probe.

14. The method of claim 10, further comprising identifying the location of at least one of the target and the NDT probe using a trained machine vision model.

15. The method of claim 10, wherein the predetermined location of the at least one NDT measurement is distanced from the target.

16. The method of claim 10, wherein the computing device is further configured to control at least one of operating parameters of the NDT probe and display parameters for the at least one NDT measurement, and wherein the GUI further comprises a virtual control panel comprising at least one user interface object operative to control a respective one of the operating parameters and display parameters in response to selection.

* * * * *